United States Patent
Hsu et al.

(10) Patent No.: US 9,966,867 B2
(45) Date of Patent: May 8, 2018

(54) DEAD TIME COMPENSATION FOR SYNCHRONOUS RECTIFIERS IN ADAPTIVE OUTPUT POWERS

(71) Applicant: SEMICONDUCTOR COMPONENTS INDUSTRIES, LLC, Phoenix, AZ (US)

(72) Inventors: Jhih-Da Hsu, Taipei (TW); Hang-Seok Choi, Bedford, NH (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days. days.

(21) Appl. No.: 15/072,751

(22) Filed: Mar. 17, 2016

(65) Prior Publication Data

US 2016/0373019 A1 Dec. 22, 2016

Related U.S. Application Data

(60) Provisional application No. 62/181,398, filed on Jun. 18, 2015.

(51) Int. Cl.
*H02M 3/335* (2006.01)
*H02M 1/38* (2007.01)

(52) U.S. Cl.
CPC .. *H02M 3/33592* (2013.01); *H02M 2001/385* (2013.01); *Y02B 70/1475* (2013.01)

(58) Field of Classification Search
CPC . H02M 2001/0003; H02M 2001/0009; H02M 2001/0032; H02M 2001/0048;
(Continued)

(56) References Cited

U.S. PATENT DOCUMENTS 6,490,119 B1   12/2002   Boylan et al.
6,535,400 B2   3/2003   Bridge
(Continued)

FOREIGN PATENT DOCUMENTS

TW   M286511 U    1/2006
TW   M411065 U1   9/2011
TW   M447631 U1   2/2013

OTHER PUBLICATIONS

Office Action dated Dec. 12, 2016 in Taiwan application (No. 105116406).

*Primary Examiner* — Emily P Pham
*Assistant Examiner* — Shahzeb K Ahmad
(74) *Attorney, Agent, or Firm* — Robert F. Hightower (57) ABSTRACT

A synchronous rectifier controller for an adaptive output power converter is provided. The synchronous rectifier controller includes a voltage detection circuit, a threshold generation circuit, and a driver. The voltage detection circuit detects an output voltage of the adaptive output power converter to generate a detection signal. The threshold generation circuit is coupled to the voltage detection circuit. The threshold generation circuit receives the detection signal and generates a synchronous rectifier (SR) turn-off threshold for a synchronous rectifier coupled to a secondary winding of the flyback converter according to the detection signal. The driver receives the SR turn-off threshold and controls the synchronous rectifier according to the SR turn-off threshold.

20 Claims, 10 Drawing Sheets

(58) Field of Classification Search
CPC .......... H02M 1/14; H02M 1/143; H02M 3/22; H02M 3/315; H02M 3/335; H02M 3/33507; H02M 3/33515; H02M 3/33523; H02M 3/33538; H02M 3/33553; H02M 3/33576; H02M 3/33592; H02M 3/1588; H02M 3/337; H02M 7/02

See application file for complete search history.

(56) References Cited

U.S. PATENT DOCUMENTS

| | | | |
|---|---|---|---|
| 7,688,602 B2 * | 3/2010 | Hu | H02M 1/08 363/21.14 |
| 7,869,231 B2 | 1/2011 | Cohen | |
| 8,102,680 B2 | 1/2012 | Ren et al. | |
| 8,139,380 B2 | 3/2012 | Sato | |
| 8,537,584 B2 | 9/2013 | Ren et al. | |
| 8,649,190 B2 | 2/2014 | Chen et al. | |
| 2010/0110732 A1 * | 5/2010 | Moyer | H02M 3/33592 363/19 |
| 2011/0205764 A1 * | 8/2011 | Sheng | H02M 1/36 363/21.09 |
| 2012/0119715 A1 * | 5/2012 | Loikkanen | H02M 3/1582 323/235 |
| 2014/0002043 A1 * | 1/2014 | Li | H02M 3/156 323/282 |
| 2015/0207423 A1 * | 7/2015 | Ganesh Kumar | H02M 3/33553 363/21.05 |
| 2015/0318785 A1 * | 11/2015 | Svorc | H02M 3/158 323/235 |
| 2016/0294298 A1 * | 10/2016 | Wong | H02M 3/33592 |

* cited by examiner

| S | R | Q | $\overline{Q}$ |
|---|---|---|---|
| 0 | 0 | Q | $\overline{Q}$ |
| 0 | 1 | 0 | 1 |
| 1 | 0 | 1 | 0 |
| 1 | 1 | X | X |

DEAD TIME COMPENSATION FOR SYNCHRONOUS RECTIFIERS IN ADAPTIVE OUTPUT POWERS

CROSS REFERENCE TO RELATED APPLICATIONS

This application claims the benefit of U.S. Provisional Application No. 62/181,398, filed on Jun. 18, 2015, the contents of which are incorporated herein by reference.

BACKGROUND OF THE INVENTION

Field of the Invention

The disclosure relates generally to a synchronous rectifier controller, and more particularly it relates to a synchronous rectifier controller for providing adaptive dead time compensation for a synchronous rectifier under adaptive output powers.

Description of the Related Art

Figure 1:
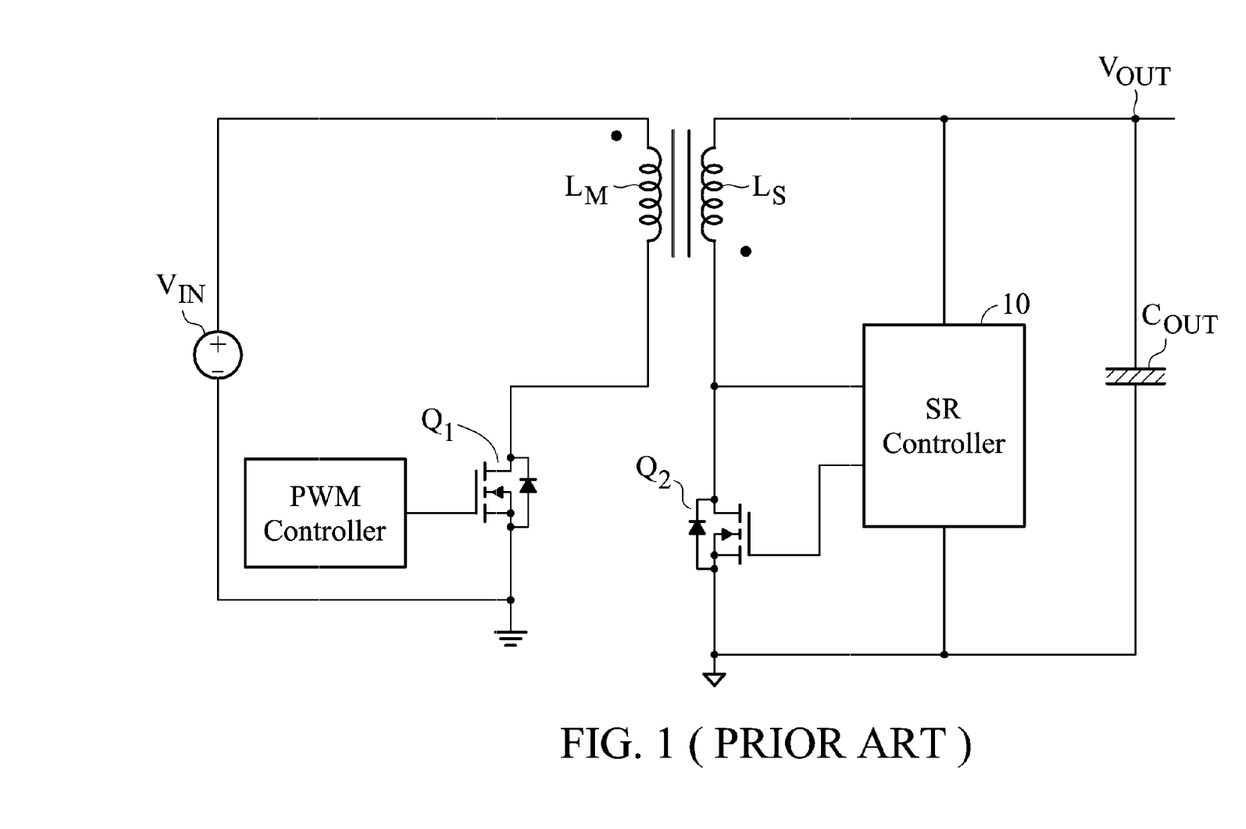
FIG. 1 shows a flyback converter.

FIG. 1 shows a flyback converter. The primary side of the flyback converter includes a primary winding $L_M$ and a power switch $Q_1$ which are connected in series. By controlling the switching of the power switch $Q_1$, the energy at the primary side can be transferred to the secondary side of the flyback converter in a flyback manner.

The secondary side includes a secondary winding (inductor) $L_S$, a synchronous rectifier, and a synchronous rectifier controller (SR controller, also referred to as "secondary-side controller") 10. The synchronous rectifier includes a switch $Q_2$ which can be implemented by a MOSFET. The SR controller 10 is coupled to control the switch $Q_2$. For adaptive output powers, the output voltage $V_{OUT}$ of the flyback converter is variable according to commands sent by a device (such as a smartphone or tablet) that is being charged by the flyback converter, and the discharging slope of the inductor (magnetic device) $L_S$ changes with the variation of the output voltage $V_{OUT}$. In the prior art, the drain-source voltage ($V_{DS}$) of the switch $Q_2$ affected by the discharging of the indictor $L_S$ is sensed and compared with a synchronous rectifier turn-off threshold (SR turn-off threshold) to control the turned-off state of the switching of the switch $Q_2$. However, the SR turn-off threshold is a fixed value. Thus, for different inductor discharging slopes, the dead time of the synchronous rectifier varies with the output voltage $V_{OUT}$. In such cases, the dead time would be longer at the lower output voltage conditions.

BRIEF SUMMARY OF THE INVENTION

The embodiments of the invention provides a synchronous rectifier controller which is capable of changing change a synchronous rectifier turn-off threshold according to an output voltage, so that the SR dead time can be kept substantially the same under different output voltages.

An embodiment of a synchronous rectifier controller for an adaptive output power converter is provided. The synchronous rectifier controller comprises a voltage detection circuit, a threshold generation circuit, and a driver. The voltage detection circuit detects an output voltage of the adaptive output power converter to generate a detection signal. The threshold generation circuit is coupled to the voltage detection circuit. The threshold generation circuit receives the detection signal and generates a synchronous rectifier (SR) turn-off threshold for a synchronous rectifier coupled to a secondary winding of the adaptive output power converter according to the detection signal. The driver receives the SR turn-off threshold and controls the synchronous rectifier according to the SR turn-off threshold.

An embodiment of a control method is provided. The control method is applied to control a synchronous rectifier coupled to a secondary winding of an daptive output power converter. The control method comprises steps of detecting an output voltage of the daptive output power converter to generate a detection signal; determining a synchronous rectifier (SR) turn-off threshold for the synchronous rectifier according to the detection signal; and controlling the synchronous rectifier according to the SR turn-off threshold.

An embodiment of a synchronous rectifier circuit is provided. The synchronous rectifier circuit comprises a a secondary-side controller. The secondary-side controller is configured to be coupled to a switch, a magnetic device, and an output of an adaptive output power converter to generate a switching signal to drive the switch. The secondary-side controller is configured to generate a SR turn-off threshold in response to a signal received from the output of the adaptive output power converter. The switching signal is controlled in response to the SR turn-off threshold.

A detailed description is given in the following embodiments with reference to the accompanying drawings.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
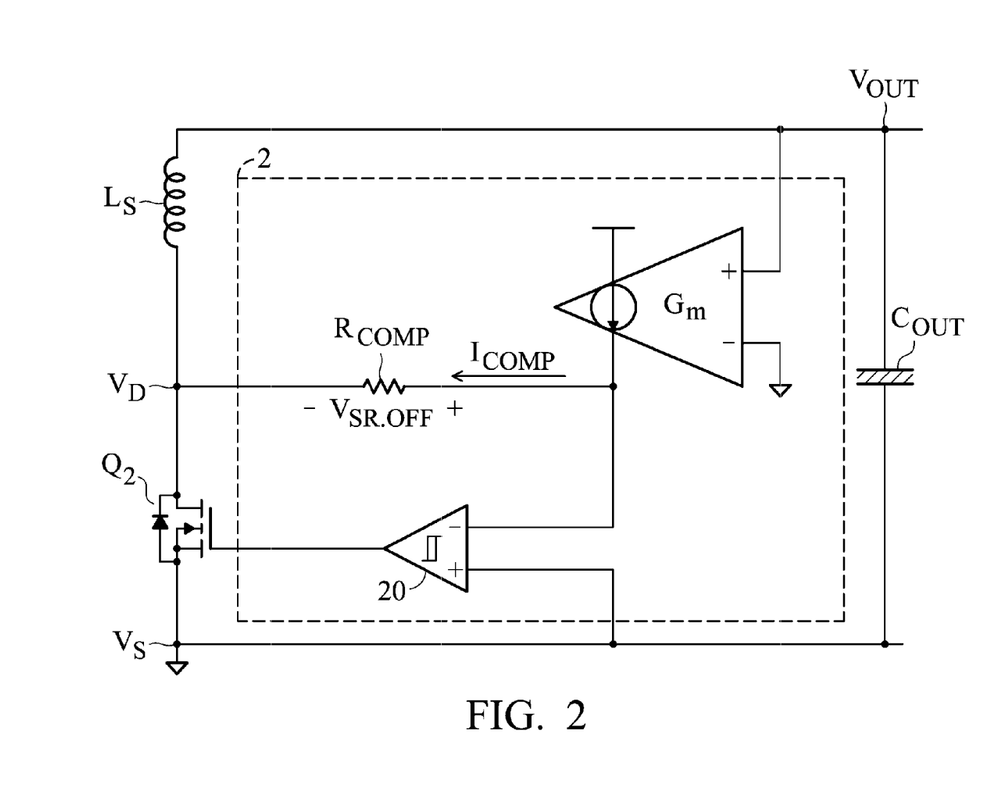
FIG. 2 shows an exemplary embodiment of a synchronous rectifier controller (SR controller) of a flyback converter.

FIG. 2 shows an exemplary embodiment of a synchronous rectifier controller (SR controller) of a flyback converter. The same element references in FIGS. 1 and 2 represent the same elements, thus, omitting the related description. In order to clearly show the features of the embodiment, FIG. 2 only shows the elements on the secondary side of a flyback converter. In the embodiment of FIG. 2, the secondary-side controller is implemented by an SR circuit 2. The SR circuit 2 changes a synchronous rectifier turn-off threshold voltage (SR turn-off threshold) according to the output voltage $V_{OUT}$ of the flyback converter, As shown in FIG. 2, the SR circuit 2 includes a SR controller and a threshold generation circuit. The SR controller includes a voltage detection circuit and a driver. The voltage detection circuit is coupled to detect the output voltage $V_{OUT}$. In the embodiment of FIG. 2, the voltage detection circuit includes a transconductance amplifier Gm which transforms the output voltage $V_{OUT}$ to a current $I_{COMP}$. Thus, the current $I_{COMP}$ serves as a detection signal which represents the detection result for the output voltage $V_{OUT}$. The threshold generation circuit is coupled to the transconductance amplifier Gm for receiving the current $I_{COMP}$ and generating a SR turn-off threshold voltage according to the received current $I_{COMP}$. In the embodiment of FIG. 2, the threshold generation circuit includes a resistor $R_{COMP}$. The current $I_{COMP}$ develops a voltage difference across the resistor $R_{COMP}$. The voltage difference serves as the SR turn-off threshold voltage. Accordingly, the SR turn-off threshold voltage $V_{SR.OFF}$ is determined according to the output voltage $V_{OUT}$ and the resistance of the resistor $R_{COMP}$. In other words, the SR turn-off threshold voltage $V_{SR.OFF}$ is changed according to the output voltage $V_{OUT}$. In the embodiment of FIG. 2, the threshold generation circuit is disposed on the inside of the SR circuit 2. In other embodiments, the threshold generation circuit can be disposed on the outside of the SR circuit 2 and coupled to the transconductance amplifier Gm.

The driver is coupled to the threshold generation circuit for controlling the switch $Q_2$ according to the determined SR turn-off threshold voltage $V_{SR.OFF}$. In the embodiment of FIG. 2, the driver includes a hysteresis comparator 20. The non-inverting terminal (+) of the hysteresis comparator 20 receives the source voltage $V_S$ of the switch $Q_2$, while the inverting terminal (−) thereof receives the sum of the drain voltage $V_D$ of the switch $Q_2$ and the SR turn-off threshold voltage $V_{SR.OFF}$. The hysteresis comparator 20 compares the sum of the drain voltage $V_D$ of the switch $Q_2$ and the SR turn-off threshold voltage $V_{SR.OFF}$ with the the source voltage $V_S$ and generates a switching signal in response to the comparison result for controlling the switching state of the switch $Q_2$.

As described above, the SR turn-off threshold voltage $V_{SR.OFF}$ is changed according to the output voltage $V_{OUT}$. Due to the changeability of the SR turn-off threshold voltage $V_{SR.OFF}$, the timing when the driver controls the switch $Q_2$ to be turned off is also changed with the output voltage $V_{OUT}$, thereby keeping the dead time of the switch $Q_2$ substantially the same under different output voltages.

According to the embodiment, in order to control the SR turn-off threshold voltage $V_{SR.OFF}$ for keeping the dead time substantially the same regardless of the change in the output voltage $V_{OUT}$, the SR turn-off threshold voltage $V_{SR.OFF}$ must satisfy the equation below:

$$\frac{V_{OUT1}}{V_{SR.OFF1}} = \frac{V_{OUT2}}{V_{SR.OFF2}} \quad (1)$$

Referring to FIG. 2, the switch $Q_2$ will be turned off when $V_{SD} < V_{SR.OFF}$. The SR turn-off threshold voltage $V_{SR.OFF}$ is determined according to the output voltage $V_{OUT}$ and the resistance of the resistor $R_{COMP}$.

When $V_{OUT} = V_{OUT1}$, $$V_{SR.OFF1} = V_{OUT1} \cdot G_m \cdot R_{COMP}$$

When $V_{OUT} = V_{OUT2}$, $$V_{SR.OFF} = V_{OUT2} \cdot G_m \cdot R_{COMP}$$

Thus, the equation (1) can be represented as:

$$\frac{V_{OUT1}}{V_{SR.OFF1}} = \frac{V_{OUT1}}{V_{OUT1} \bullet G_m \bullet R_{COMP}} \quad (2)$$

$$\frac{V_{OUT2}}{V_{SR.OFF2}} = \frac{V_{OUT2}}{V_{OUT2} \bullet G_m \bullet R_{COMP}} \quad (3)$$

By simplifying the terms on right sides of the equal signs of the equations (2) and (3), we can obtain the equation (1):

$$\frac{V_{OUT1}}{V_{SR.OFF1}} = \frac{V_{OUT2}}{V_{SR.OFF2}}$$

According to the equation (1), the output voltage $V_{OUT}$ and the SR turn-off threshold voltage $V_{SR.OFF}$ are in a positive correlation. In the embodiment of FIG. 2, the SR turn-off threshold voltage $V_{SR.OFF}$ is in direct proportion to the output voltage $V_{OUT}$. Particularly, in the embodiment of FIG. 2, there is a linear relationship between the output voltage $V_{OUT}$ and the SR turn-off threshold voltage $V_{SR.OFF}$. Based on the equation (1), the SR controller 2 is capable of changing the SR rectifier turn-off threshold voltage $V_{SR.OFF}$ with the variation of the output voltage $V_{OUT}$. Thus, we can conclude that the SR turn-off threshold voltage $V_{SR.OFF}$ is well compensated for.

Figure 3:
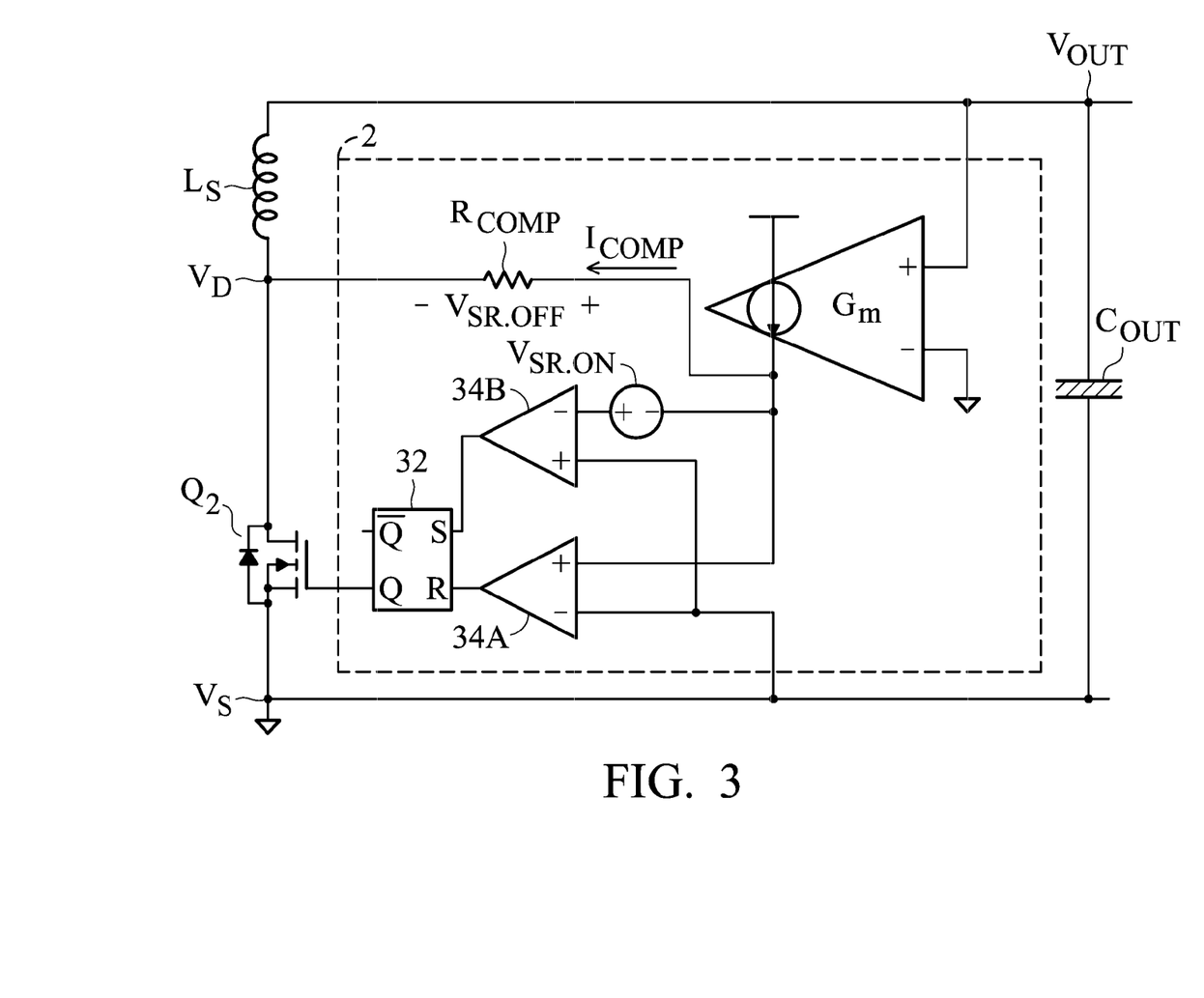
FIG. 3 shows another exemplary embodiment of an SR controller of a flyback converter.
Figure 4:
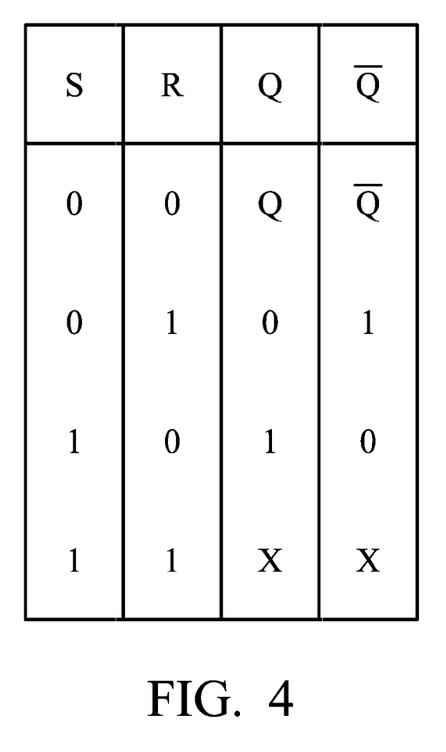
FIG. 4 shows a true table of a flip-flop in FIG. 3.

In another embodiment, the driver includes two independent comparators which are coupled to respectively turn on and off the switch $Q_2$. As shown in FIG. 3, the driver includes a flip-flop 32 and comparators 34A and 34B which replace the hysteresis comparator 20 in the driver of FIG. 2. FIG. 4 shows a true table of the flip-flop 32. The inverting terminal (−) of the comparator 34A and the non-inverting terminal (+) of the comparator 34B receive the source voltage $V_S$ of the switch $Q_2$. The non-inverting terminal (+) of the comparator 34A receives the sum of the drain voltage $V_D$ and the SR turn-off threshold voltage $V_{SR.OFF}$. The inverting terminal (−) of the comparator 34B receives the sum of the drain voltage $V_D$, the SR turn-off threshold voltage $V_{SR.OFF}$, and the SR turn-on threshold voltage (SR turn-on threshold) $V_{SR.ON}$. When the sum of the drain voltage $V_D$ and the SR turn-off threshold voltage $V_{SR.OFF}$ exceeds the source voltage $V_S$, the comparator 34A outputs a high logic level signal to the R terminal of the flip-flop 32. Thus, the Q terminal of the flip-flop 32 outputs a low logic level signal (a driving signal with a low logic level) to turn off the switch $Q_2$. When the sum of the drain voltage $V_D$, the SR turn-off threshold voltage $V_{SR.OFF}$, and the SR turn-on threshold voltage $V_{SR.ON}$ is lower than the source voltage $V_S$, the comparator 34B outputs a high logic level signal to the S terminal of the flip-flop 32. Thus, the Q terminal of the flip-flop 32 outputs a high logic level signal (a driving signal with a high logic level) to turn on the switch $Q_2$.

Figure 5A:
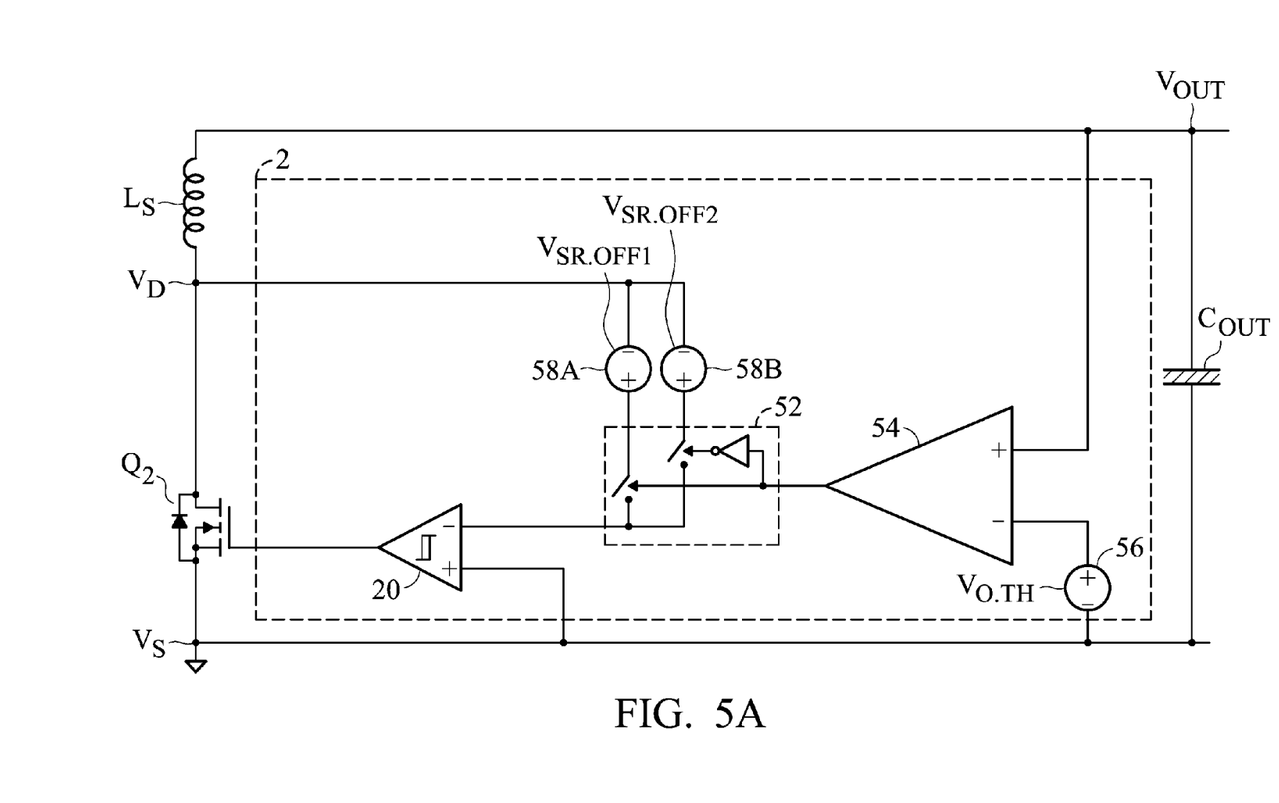
FIG. 5A shows further another exemplary embodiment of an SR controller of a flyback converter.

FIG. 5A shows another exemplary embodiment of the SR controller. As shown in FIG. 5A, the different between FIGS. 2 and 5A is that the voltage detection circuit of FIG. 5A includes a comparator 54 and a voltage source 56 which replaces the transconductance amplifier Gm of FIG. 2A and the threshold generation circuit of FIG. 5A includes a multiplexer 52 and voltage sources 58A and 58B which replace the resistor $R_{COMP}$ of FIG. 2. The voltage source 56 provides an output threshold voltage (output threshold) $V_{O.TH}$ to the inverting terminal (−) of the comparator 54. The non-inverting terminal (+) of the comparator 54 receives the output voltage $V_{OUT}$. The comparator 54 compares the output voltage $V_{OUT}$ with the output threshold voltage $V_{O.TH}$ thereby achieving the detection of the output voltage $V_{OUT}$. A detection signal (indicating the comparison result) output from the comparator 54 represents the detection result of the output voltage $V_{OUT}$. The voltage source 58A provides an SR turn-off threshold voltage $V_{SR.OFF1}$, while the voltage source 58B provides another SR turn-off threshold voltage $V_{SR.OFF2}$. The multiplexer 52 is coupled to the comparator 54 for obtaining the detection signal and selecting the SR turn-off threshold voltage $V_{SR.OFF1}$ or $V_{SR.OFF2}$ to serve as the SR turn-off threshold for the switch $Q_2$. When the output voltage $V_{OUT}$ exceeds the output threshold voltage $V_{O.TH}$, the comparator 54 controls the multiplexer 52 to select the SR turn-off threshold voltage $V_{SR.OFF1}$ and provide the sum of the drain voltage $V_D$ and the SR turn-off threshold voltage $V_{SR.OFF1}$ to the inverting terminal of the hysteresis comparator 20. When the output voltage $V_{OUT}$ is lower than the output threshold voltage $V_{O.TH}$, the comparator 54 controls the multiplexer 52 to select the SR turn-off threshold voltage $V_{SR.OFF2}$ and provide the sum of the drain voltage $V_D$ and the SR turn-off threshold voltage $V_{SR.OFF2}$ to the inverting terminal of the hysteresis comparator 20. In this embodiment, since a lower output voltage should be prevented from the increasing of the dead time, the SR turn-off threshold voltage $V_{SR.OFF2}$ is lower than the SR turn-off threshold voltage $V_{SR.OFF1}$. Accordingly, the comparator 54 compares the output voltage $V_{OUT}$ with the output threshold voltage $V_{O.TH}$ to determine the variable SR turn-off threshold of the switch $Q_2$.

Figure 5B:
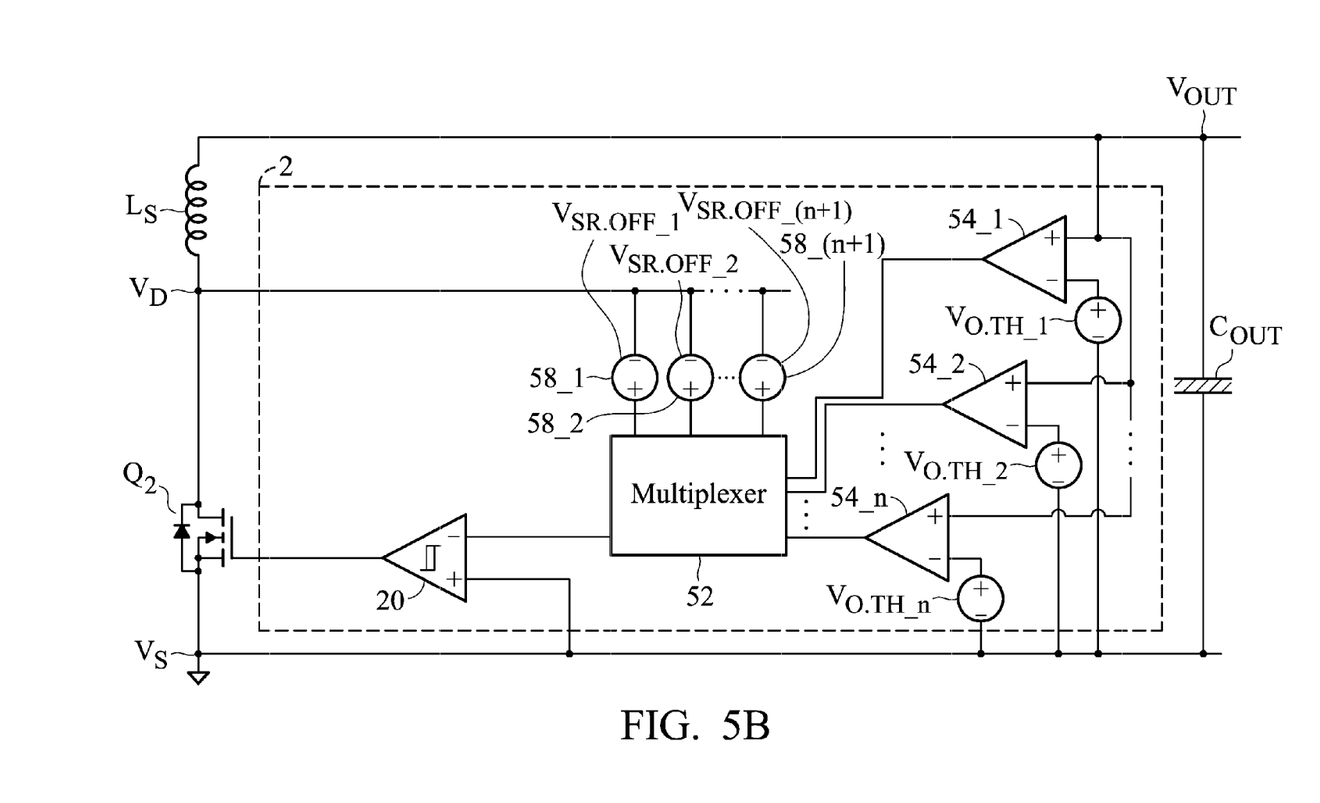
FIG. 5B shows an exemplary embodiment of an SR controller of a flyback converter.

FIG. 5B shows further another exemplary embodiment of an SR controller. The difference between FIGS. 5B and 5A is that n sets of comparators 54_1~54_n and n+1 sets of voltage sources 58_1~58_(n+1) are used to provide the SR turn-off threshold voltages $V_{SR.OFF\_1}$~$V_{SR.OFF\_(n+1)}$. The non-inverting terminals of the comparators 54_1~54_n are coupled to the output voltage $V_{OUT}$, the inverting terminals of the comparators 54_1~54_n are respectively coupled to the output threshold voltages $V_{O.TH\_1}$~$V_{O.TH\_n}$. The detection signals (indicating the comparison result) output from the comparators 54_1~54_n represent the detection result of the output voltage $V_{OUT}$. In this embodiment, the output threshold voltages $V_{O.TH\_1}$~$V_{O.TH\_n}$ are stepped decreased, and the SR turn-off threshold voltages $V_{SR.OFF\_1}$~$V_{SR.OFF\_(n+1)}$ are also stepped decreased. The multiplexer 52 selects one of the SR turn-off threshold voltages $V_{SR.OFF\_1}$~$V_{SR.OFF\_(n+1)}$ to serve as the SR turn-off threshold for the switch $Q_2$. Accordingly, the multiplexer 52 selectively provides the sum of the drain voltage $V_D$ and one of the (n+1) SR turn-off threshold voltages $V_{SR.OFF\_1}$~$V_{SR.OFF\_(n+1)}$ to the inverting terminal of the hysteresis comparator 20 according to the comparison result of the comparators 54_1~54_n. For example, the sum of the drain voltage $V_D$ and the SR turn-off threshold voltages $V_{SR.OFF\_1}$ is provided to the inverting terminal of the hysteresis comparator 20 when the comparator 54_1 outputs a high logic level signal. In another embodiment, the sum of the drain voltage $V_D$ and the SR turn-off threshold voltages $V_{SR.OFF\_(n+1)}$ is provided to the inverting terminal of the hysteresis comparator 20 when no comparator outputs the high logic level signal.

Figure 6A:
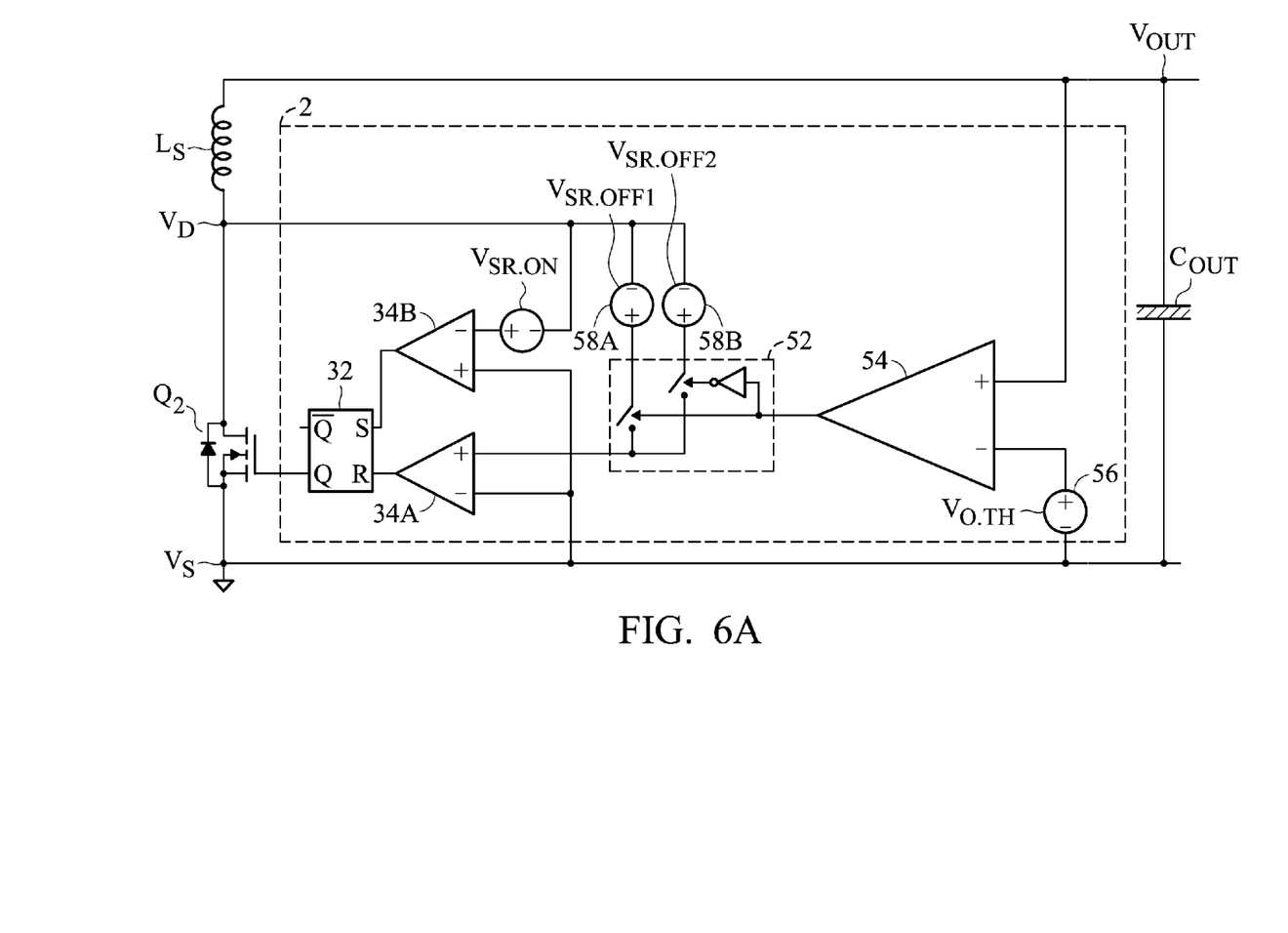
FIG. 6A shows another exemplary embodiment of an SR controller of a flyback converter.

FIG. 6A shows an exemplary embodiment of an SR controller. The difference between FIGS. 6A and 5A is that the driver includes a flip-flop 32 and comparators 34A and 34B which replace the hysteresis comparator 20 in the driver of FIG. 5A. The operations of the flip-flop 32 and the comparators 34A and 34B are the same as the description related to FIG. 3A. When the sum of the drain voltage $V_D$ and the SR turn-off threshold voltage $V_{SR.OFF1}$ or $V_{SR.OFF2}$ provided by the multiplexer 52 exceeds the source voltage $V_S$, the comparator 34A outputs a high logic level signal to the R terminal of the flip-flop 32. Thus, the Q terminal of the flip-flop 32 outputs a low logic level signal to turn off the switch $Q_2$. When the sum of the drain voltage $V_D$ and the SR turn-on threshold voltage $V_{SR.ON}$ is lower than the source voltage $V_S$, the comparator 34B outputs a high logic level signal to the S terminal of the flip-flop 32. Thus, the Q terminal of the flip-flop 32 outputs a high logic level signal to turn on the switch $Q_2$.

Figure 6B:
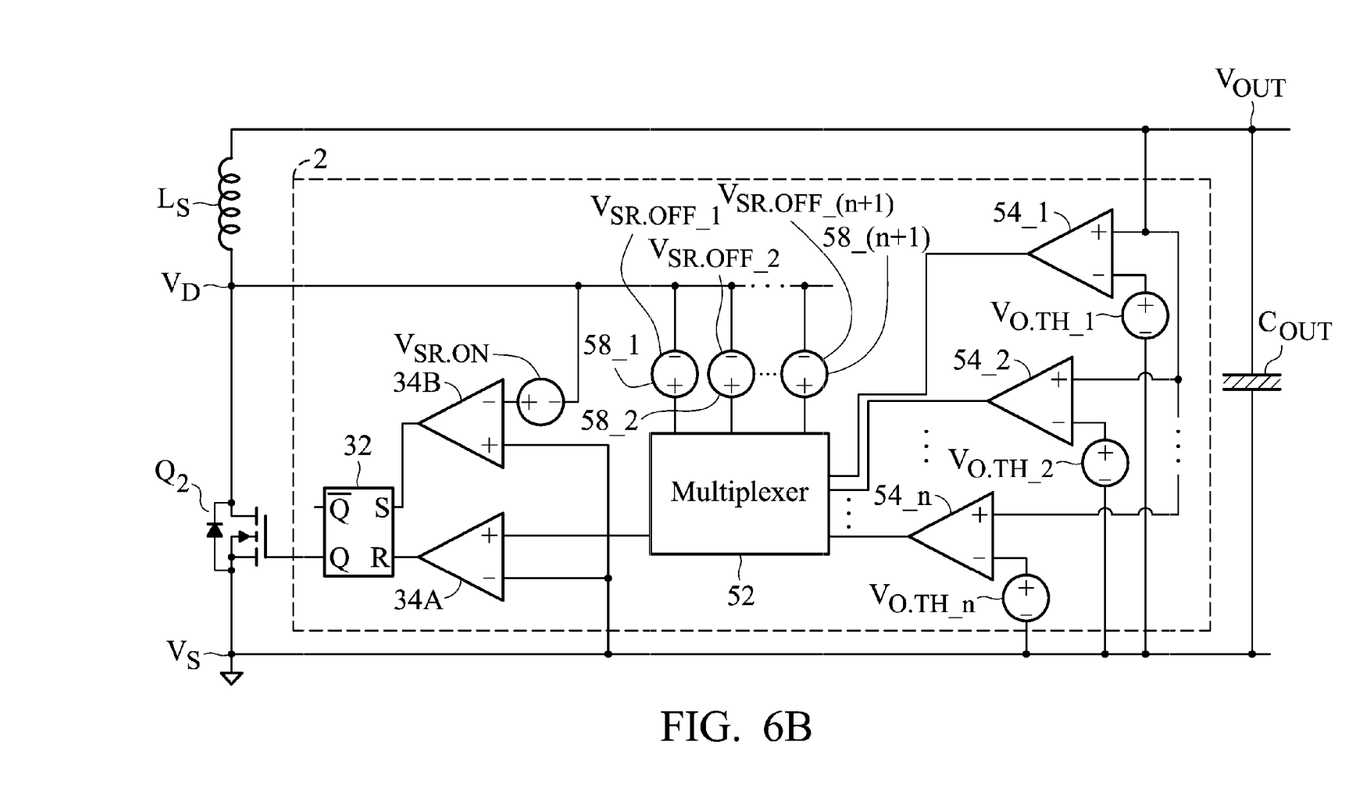
FIG. 6B shows further another exemplary embodiment of an SR controller of a flyback converter.

FIG. 6B shows another embodiment of an SR controller. The difference between FIG. 6B and FIG. 6A is that n sets of comparators 54_1~54_n and n+1 sets of voltage sources 58_1~58_(n+1) are used to provide the SR turn-off threshold voltages $V_{SR.OFF\_1}$~$V_{SR.OFF\_(n+1)}$. The operations of the comparators 54_1~54_n, the multiplexer 52, and the SR turn-off threshold voltages $V_{SR.OFF\_1}$~$V_{SR.OFF\_(n+1)}$ are the same as the description related to FIG. 5B. The non-inverting terminals of the comparators 54_1~54_n are coupled to the output voltage $V_{OUT}$, the inverting terminals of the comparators 54_1~54_n are respectively coupled to the output threshold voltages $V_{O.TH\_1}$~$V_{O.TH\_n}$. The detection signals (indicating the comparison result) output from the comparators 54_1~54_n represent the detection result of the output voltage $V_{OUT}$. In this embodiment, the output threshold voltages $V_{O.TH\_1}$~$V_{O.TH\_n}$ are stepped decreased, the SR turn-off threshold voltages $V_{SR.OFF\_1}$~$V_{SR.OFF\_(n+1)}$ are also stepped decreased. The multiplexer 52 selects one of the SR turn-off threshold voltages $V_{SR.OFF\_1}$~$V_{SR.OFF\_(n+1)}$ to serve as the SR turn-off threshold for the switch $Q_2$. Accordingly, the multiplexer 52 selectively provides the sum of the drain voltage $V_D$ and one of the (n+1) SR turn-off threshold voltages $V_{SR.OFF\_1}$~$V_{SR.OFF\_(n+1)}$ to the non-inverting terminal of the comparator 34A according to the comparison result of the comparators 54_1~54_n. For example, the sum of the drain voltage $V_D$ and the SR turn-off threshold voltage $V_{SR.OFF\_1}$ is provided to the non-inverting terminal of the comparator 34A when the comparator 54_1 outputs a high logic level signal. In another embodiment, the sum of the drain voltage $V_D$ and the SR turn-off threshold voltages $V_{SR.OFF\_(n+1)}$ is provided when no comparator outputs the high logic level signal. In addition, when the sum of the drain voltage $V_D$ and one of the SR turn-off threshold voltage $V_{SR.OFF\_1}$~$V_{SR.OFF\_(n+1)}$ provided by the multiplexer 52 exceeds the source voltage $V_S$, the comparator 34A outputs a high logic level signal to the R terminal of the flip-flop 32. Thus, the Q terminal of the flip-flop 32 outputs a low logic level signal to turn off the switch $Q_2$. When the sum of the drain voltage $V_D$ and the SR turn-on threshold voltage $V_{SR.ON}$ is lower than the source voltage $V_S$, the comparator 34B outputs a high logic level signal to the S terminal of the flip-flop 32. Thus, the Q terminal of the flip-flop 32 outputs a high logic level signal to turn on the switch $Q_2$. In the above embodiments, the (n+1) SR turn-off threshold voltages are applied for providing an SR turn-off threshold for the switch $Q_2$. The voltage sources providing the (n+1) SR turn-off threshold voltages are given an example, without limitation to the invention. In other embodiments, the structure of the sources which provide the (n+1) SR turn-off threshold voltages can be implemented by other elements, such as the combination of voltage sources and resistors.

Figure 7A:
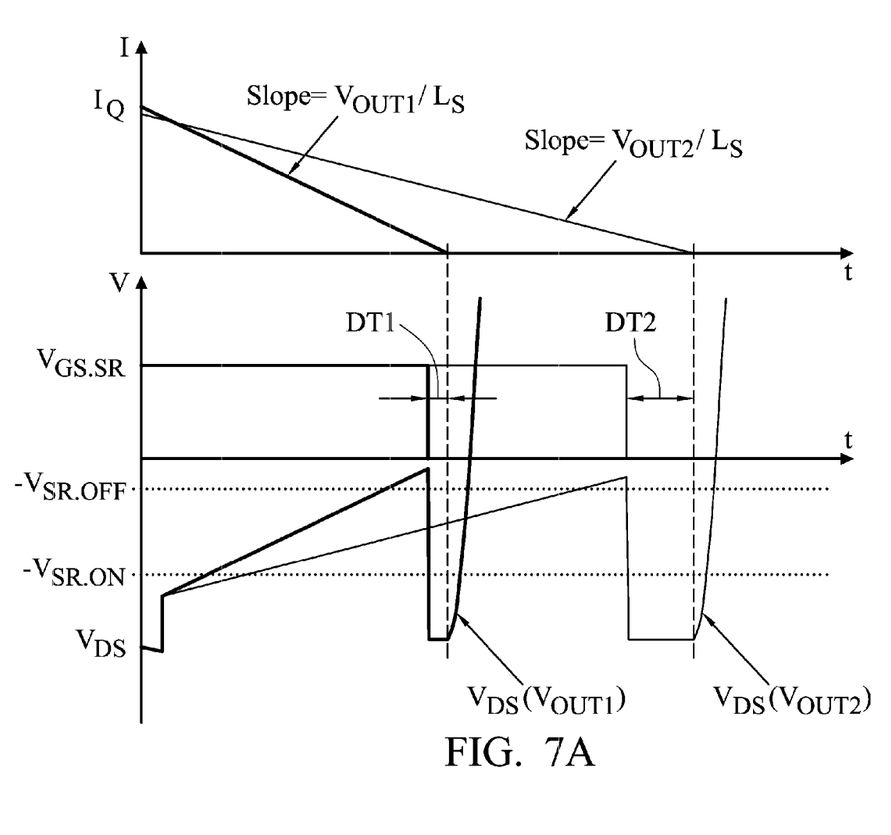
FIG. 7A shows a waveform of a drain-source voltage of a switch of a synchronous rectifier without any dead time compensation.

FIG. 7A shows the waveform of the drain-source voltage $V_{DS}$ of the switch $Q_2$ without any dead time compensation. Here, the output voltage $V_{OUT1}$ is higher than the output voltage $V_{OUT2}$. The signal $V_{GS.SR}$ applied to the gate of the switch $Q_2$ is deasserted according to the time when the drain-source voltage $V_{DS}$ of the switch $Q_2$ reaches the fixed threshold voltage ($V_{SR.OFF}$) The period of the dead time of the switch $Q_2$ is determined between the time point when the signal $V_{GS.SR}$ applied to the gate of the switch $Q_2$ is deasserted and the time point when the current $I_Q$ of the inductor $L_S$ becomes zero. As shown in FIG. 7A, due to the fixed threshold voltage $V_{SR.OFF}$, the dead time DT2 corresponding to the output voltage $V_{OUT2}$ is longer than the dead time DT1 corresponding to the output voltage $V_{OUT1}$.

Figure 7B:
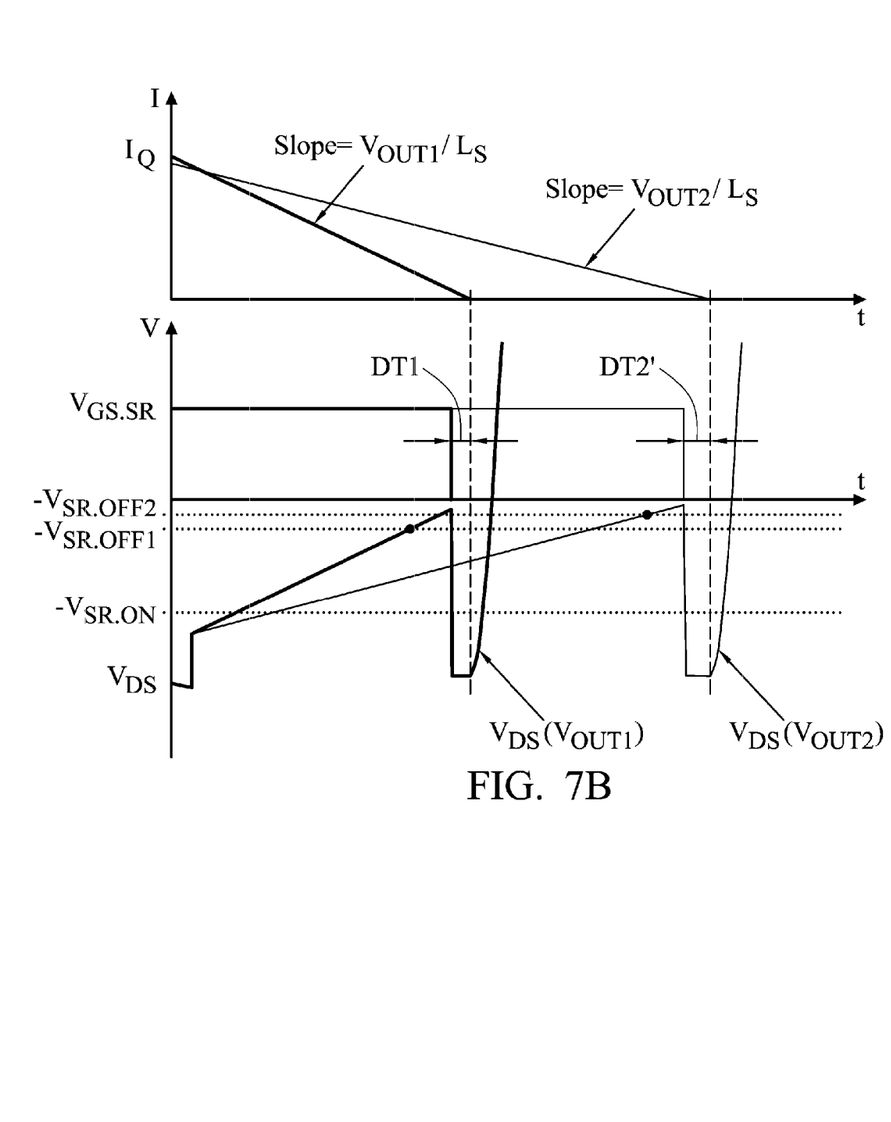
FIG. 7B shows a waveform of a drain-source voltage of a switch of a synchronous rectifier with dead time compensation performed by at least one embodiment.

FIG. 7B shows the waveform of the drain-source voltage $V_{DS}$ of the switch $Q_2$ with dead time compensation disclosed by the above embodiments. As shown in FIG. 7B, another threshold voltage $V_{SR.OFF2}$, which is lower than the threshold voltage $V_{SR.OFF1}$, is provided for the output voltage $V_{OUT2}$ to compensate for the longer dead time. The output voltage $V_{OUT2}$ is lower than the output voltage $V_{OUT1}$. Therefore, compared with the dead time DT2 of FIG. 7A, the compensated dead time DT2' corresponding to the output voltage $V_{OUT2}$ is narrowed and substantially the same as dead time DT1. Thus, the dead time for adaptive output powers is well compensated for.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A synchronous rectifier controller for an adaptive output power converter comprising:
   a voltage detection circuit configured to detect an output voltage of the adaptive output power converter to generate a detection signal;
   a threshold generation circuit coupled to the voltage detection circuit, for receiving the detection signal and for generating a synchronous rectifier (SR) turn-off threshold for a synchronous rectifier coupled to a secondary winding of the adaptive output power converter according to the detection signal, the threshold generation circuit configured to form the turn-off threshold as representative of a difference between the output voltage and a voltage at a drain of the secondary rectifier; and
   a driver configured to receive the SR turn-off threshold, the driver having an output configured to be connected to the synchronous rectifier and configured to control the synchronous rectifier according to the SR turn-off threshold.

2. The synchronous rectifier controller of claim 1, wherein the voltage detection circuit comprises:
   a transconductance amplifier transforming the output voltage to the detection signal.

3. The synchronous rectifier controller of claim 1, wherein the threshold generation circuit comprises:
   a resistor coupled between the synchronous rectifier and the voltage detection circuit, wherein the SR turn-off threshold is determined by the output voltage and a resistance of the resistor.

4. The synchronous rectifier controller of claim 1, wherein the driver comprises:
   a hysteresis comparator comparing a source voltage at one electrode of the synchronous rectifier with a sum of a drain voltage at the other electrode of the synchronous rectifier and the SR turn-off threshold for controlling the synchronous rectifier.

5. The synchronous rectifier controller of claim 1, wherein the driver comprises:
   a first comparator comprising a source voltage at one electrode of the synchronous rectifier with a sum of a drain voltage at the other electrode of the synchronous rectifier and the SR turn-off threshold;
   a second comparator comparing the source voltage with a sum of the drain voltage, the SR turn-off threshold, and an SR turn-on threshold; and
   a flip-flop generating a driving signal according to a comparison result of the first comparator and a comparison result of the second comparator for turning on or off the synchronous rectifier.

6. The synchronous rectifier controller of claim 1, wherein the driver comprises:
   a at least one comparator comparing at least one output threshold with the output voltage to generate the detection signal according to a comparison result of the comparator,
   wherein the SR turn-off threshold is determined by the detection signal.

7. The synchronous rectifier controller of claim 6, wherein the threshold generation circuit comprise:
   at least one source providing at least one SR turn-off threshold voltage;
   wherein the least one SR turn-off threshold voltage serves as the SR turn-off threshold according to the detection signal.

8. The synchronous rectifier controller of claim 7, wherein the threshold generation circuit further comprises:
   a multiplexer selecting one of the at least one SR turn-off threshold voltage according to the detection signal to serve as the SR turn-off threshold.

9. The synchronous rectifier controller of claim 1, wherein the SR turn-off threshold is stepped decreased in value according to the output voltage being stepped decreased in value.

10. The synchronous rectifier controller of claim 1 wherein the voltage detection circuit includes a transconductance amplifier coupled to receive the output voltage, and wherein the threshold generation circuit includes a resistor having a first terminal coupled to receive the detection signal from the transconductance amplifier and a second terminal coupled to receive a signal from the secondary winding.

11. The synchronous rectifier controller of claim 1 wherein the voltage detection circuit includes a comparator coupled to compare the output voltage to an output threshold reference voltage, and wherein the threshold generation circuit includes a voltage source having a first terminal configured to be coupled to an output of the comparator and a second terminal coupled to receive a signal from the secondary winding.

12. A method for forming a synchronous rectifier coupled to a secondary winding of an adaptive output power converter, comprising:
   configuring a control circuit to detect an output voltage of the adaptive output power converter to generate a detection signal;
   configuring a threshold circuit to form a synchronous rectifier (SR) turn-off threshold for the synchronous rectifier according to the detection signal; and
   configuring the control circuit to control the synchronous rectifier according to a sum of the SR turn-off threshold and a signal received from the secondary winding.

13. The control method of claim 12, wherein the step of determining the SR turn-off threshold comprises:
   providing at least one threshold voltage;
   selecting one of the least one threshold voltage according to the detection signal to serve as the SR turn-off threshold.

14. The control method of claim 12, wherein the step of determining the SR turn-off threshold comprises:
   determining the SR turn-off threshold according to a resistance and the detection signal.

15. The control method of claim 12, wherein the step of detecting the output voltage of the adaptive output power converter comprises:
   comparing the output voltage with at least one output threshold to generate the detection signal.

16. The method of claim 12, wherein the step of configuring the control circuit to control the synchronous rectifier comprises:
   configuring the control circuit to compare a source voltage at one electrode of the synchronous rectifier with a sum of a drain voltage at the other electrode of the synchronous rectifier and the SR turn-off threshold; and
   configuring the control circuit to control the synchronous rectifier according to the comparison result.

17. A synchronous rectifier circuit comprising:
   a secondary-side controller configured to be coupled to a switch, a magnetic device, and an output of an adaptive output power converter to generate a switching signal to drive the switch;
   the switch on a secondary side of the magnetic device and connected to a secondary winding of the magnetic device; and
   the secondary side controller connected on the secondary side of the magnetic device and directly receiving a signal from the secondary winding;
   wherein the secondary-side controller is configured to generate a SR turn-off threshold in response to a signal received from the output of the adaptive output power converter, and the switching signal is controlled in response to a sum of the signal from the secondary winding and the SR turn-off threshold.

18. The synchronous rectifier circuit of claim 17, wherein the SR turn-off threshold is stepped adjusted in value according to the signal received from the output of the adaptive output power converter.

19. The synchronous rectifier circuit of claim 17 wherein the secondary-side controller includes a comparator coupled to compare an output voltage of the adaptive output power converter to an output threshold reference voltage, the secondary-side controller also including a voltage source having a first terminal configured to be coupled to an output of the comparator and a second terminal coupled to receive the signal from the secondary winding.

20. The synchronous rectifier circuit of claim 17 wherein the secondary-side controller includes a transconductance amplifier configured to receive an output voltage of the adaptive output power converter and form a signal that is representative of the output voltage.

* * * * *